United States Patent [19]
Darley et al.

[11] 3,784,898
[45] Jan. 8, 1974

[54] METHOD FOR REDUCING BOREHOLE SIGNALS IN NUCLEAR MAGNETIC LOGGING

[75] Inventors: Henry C. H. Darley; Joseph D. Robinson, both of Houston, Tex.

[73] Assignee: Shell Oil Company, Houston, Tex.

[22] Filed: Feb. 16, 1972

[21] Appl. No.: 226,988

[52] U.S. Cl. .............................................. 324/0.5 R
[51] Int. Cl. ........................................... G01n 27/78
[58] Field of Search ....................... 324/0.5 R, 0.5 G

[56] References Cited
UNITED STATES PATENTS
3,213,354   10/1965   Baker .............................. 324/0.5 G
3,252,082   5/1966    Hiller .............................. 324/0.5 G
3,462,674   8/1969    Baker .............................. 324/0.5 G OTHER PUBLICATIONS
R. J. S. Brown and B. W. Gamson – Nuclear Magnetism Logging – Journal of Pet. Tech. – V.219 – Aug. 1960–pp. 201–209.

*Primary Examiner*—Michael J. Lynch
*Attorney*—Theodore E. Bieber

[57] ABSTRACT

In a nuclear magnetic logging system a method for reducing the proton free-precession signal emanating from the borehole fluids by replacing the borehole fluid with a fluid containing at least 0.10 lbs/bbl of fluid of magnetized magnetite. The magnetite is first mixed with a fluid to form a concentrated mixture or slurry and the slurry passed through a magnetic field to magnetize the magnetite. The concentrated slurry is then mixed with additional fluid to provide a fluid for use in displacing the borehole fluid.

6 Claims, No Drawings

METHOD FOR REDUCING BOREHOLE SIGNALS IN NUCLEAR MAGNETIC LOGGING

BACKGROUND OF THE INVENTION

The present invention relates to a method for reducing the bore-hold signals in a nuclear magnetic logging system and particularly reducing the proton free-precession signal emanating from borehole fluids. A description of a nuclear magnetic logging system is contained in Petroleum Transactions of the AIME, 1960, Volume 219, pages 201–209. As indicated in this article, a nuclear magnetic logging tool comprises a downhole tool having a coil for producing a magnetic field in the borehole and the surrounding formation. This field is called the polarizing field and serves to align the protons in the fluids contained in the borehole and the formation. The polarizing signal is then removed and the resulting sinusoidal signal detected to determine the amplitude and the relaxation times $T_1$ and $T_2$. From the resulting amplitude and relaxation times one can determine the characteristics of the fluids in the formation surrounding the borehole.

As indicated in the article, the fluid filling the borehole, which is normally drilling mud, is treated to prevent the observation of signals emanating from the borehole fluid. A typical method for treating the borehole fluid is to add approximately 100 lbs/1,000 bbl of fluid of powered magnetite to prevent the observation of signals from the borehole fluid.

While the above logging system has provided some information regarding the formation fluids, the measurements of the signals from the formation fluids have sometimes been obscured by signals from borehole fluids.

BRIEF SUMMARY OF THE INVENTION

It has been discovered that the inconsistencies in the measured relaxation times occur as a result of the non-uniform mixing of the magnetite with the borehole fluid and the failure of the logging tool to uniformly magnetize the magnetite particles. As explained in the article, it has been the practice to merely add powdered magnetite to the borehole fluids, for example, in the mud pits, and then circulate the resulting mixture through the borehole to displace the borehole fluid. This has produced a non-uniform distribution of the magnetite of non-uniform magnetization in the borehole fluid with the resulting variation in the measured relaxation times and amplitudes.

It has also been discovered that a uniform mixture of the magnetite and borehole fluid may be obtained by first providing a concentrated slurry of magnetite in a suitable fluid. This concentrate slurry is then passed through a magnetic field to magnetize the powdered magnetite particles. The concentrated slurry is then added to the borehole fluid, for example, by adding it either at the hopper or in front of a high pressure jet in the mud pits at a uniform rate, and circulating the resulting drilling mud through the borehole to displace the borehole fluid. The concentrated slurry must be added to the mud system at a point where there is considerable agitation to provide a uniform distribution of the magnetized magnetite particles.

The signal amplitudes and relaxation times measured when the borehole fluid has been treated as outlined above are uniform and repeatable. Thus more accurate information may be obtained regarding the fluids filling the formations surrounding the borehole.

PREFERRED EMBODIMENT

It has been discovered that in order to effectively reduce the proton free-precession signal emanating from borehole fluid it is necessary to mix approximately 0.10 lbs/bbl of magnetite with the borehole fluid. This concentration will produce a $T_2$ relaxation time of approximately 2.1 milliseconds for the borehole fluid and effectively eliminate the borehole signal from the response of the logging tool.

A concentrated slurry suitable for obtaining the above borehole concentration of magnetite can be prepared by adding 110 lbs. to a barrel of fluid which is compatible with the borehole fluid. When the borehole fluid is a water-based drilling mud, a compatible fluid would comprise a mixture of bentonite clay and water. When the borehole fluid comprises an oil-based drilling mud, an oil base concentrate may be provided by adding 25 lbs. of a gelling agent, such as a synthetic organophilic colloid sold under the trade name Geltone by the Baroid Division of National Lead Company, per barrel of diesel oil. Using either the oil base or water base concentrate, one then adds 110 lbs. of magnetite per barrel of liquid which will yield a concentrate of approximately 100 lbs. per barrel of liquid. Preferably, a magnetite of approximately 0.4 micron size supplied by the Pfizer Chemical Company and designated magnetite BK5099 is used.

After the concentrated slurry of drilling mud and magnetite has been prepared, it is passed between the poles of a magnet having a field of several hundred gauss to permanently magnetize the magnetite. This can be easily accomplished by placing a plastic tube between the poles of a magnet and flowing the concentrate slurry through the tube and into suitable containers. It has been found convenient to store the concentrated solution in 5-gallon plastic containers. These are more convenient to handle and the plastic, of course, does not alter the magnetic characteristics of the concentrated magnetite slurry. Also, the 5-gallon units can be added to most mud systems at a convenient rate to obtain the desired downhole concentration of approximately 0.10 lbs./bbl of mud. For example, when the concentrated solution comprises 100 lbs/bbl of magnetite in 5-gallon containers and the mud is being circulated at approximately 400 gallons per minute, one would have to add a 5-gallon container every 12 ½ minutes to the mud system to obtain a concentration of 0.10 lbs/bbl.

From the above description it is seen that the invention comprises first preparing a concentrated slurry of magnetite and a suitable liquid. This liquid is chosen to be compatible with the mud system used in drilling the well. For example, in the case of water-based muds, a bentonite clay is added to water to provide a concentrated slurry weighing approximately 15 lbs./gallon of liquid. In the case of oil-based muds, approximately 25 lbs. of Geltone can be added to a 42 gallon barrel of diesel oil to provide a suitable liquid. The concentrated slurry is formulated by adding 110 lbs. of magnetite to either the water-based or the oil-based liquid. The concentrated slurry is then thoroughly mixed and passed between the poles of a magnet, providing a field of at least several hundred gauss. This magnetizes the magnetite particles and the slurry can then be stored in suitable containers for use, for example, plastic containers.

When it is desired to treat the mud system of a well, the 5-gallon containers of concentrated slurry are added to the mud system as the drilling mud is circulated. The containers are added at a predetermined rate to provide the desired concentration. The predetermined rate will of course depend upon the quantity of mud being circulated and the desired concentration. As set forth above, in the case of a 400 gallon per minute circulation rate and a desired concentration of 1:1,000 of the concentrated solution, one 5-gallon container would be required every 12 ½ minutes of mud circulation.

After the mud system has been treated to obtain the desired concentration of magnetite, the nuclear magnetic log may be run following normal procedure.

We claim as our invention:

1. A method for suppressing borehole signals when conducting nuclear magnetic logging operations in fluid filled boreholes; said methods comprising:

preparing a concentrated slurry of magnetite and a fluid compatible with the fluid filling the borehole;

magnetizing the magnetite in said concentrated slurry;

adding said concentrate slurry to the fluid in the borehole to obtain a concentration of at least 0.1 pounds of magnetite per barrel of fluid; and logging the borehole using a nuclear magnetic logging system.

2. The method of claim 1 wherein the magnetizied magnetite is added to the borehole fluid by adding it to the fluid at the surface and then circulating the fluid containing magnetite through the borehole to replace the borehole fluid.

3. The method of claim 2 wherein the concentrated solution of magnetite is prepared by suspending at least 50 pounds of magnetite in a barrel of the compatible fluid and then passing the concentrated solution through a magnetic field.

4. The method of claim 3 wherein the compatible fluid is diesel oil.

5. The method of claim 3 wherein the compatible solution is a water-based drilling mud.

6. The method of claim 1 wherein the borehole fluid is drilling mud and the concentrated slurry is added to the drilling mud in the mud pits and then circulated through the borehole by the mud pump.

* * * * *